US 8,478,693 B1
Jul. 2, 2013

(12) United States Patent
Weigle et al.

(54) FRAMEWORK FOR SPECIFYING ACCESS TO PROTECTED CONTENT

(75) Inventors: Eric H. Weigle, Palo Alto, CA (US); Maricia S. Scott, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/371,715

(22) Filed: Feb. 13, 2012

(51) Int. Cl.
G06F 21/00 (2006.01)

(52) U.S. Cl.
USPC ............... 705/51; 705/52; 705/53; 705/54; 705/55; 705/56; 705/57; 705/58; 705/59

(58) Field of Classification Search
USPC ...................................... 705/51–59
See application file for complete search history.

(56) References Cited

U.S. PATENT DOCUMENTS

| | | | | |
|---|---|---|---|---|
| 5,845,259 | A * | 12/1998 | West et al. | 705/14.38 |
| 6,775,539 | B2 * | 8/2004 | Deshpande | 455/414.4 |
| 7,231,357 | B1 * | 6/2007 | Shanman et al. | 705/14.23 |
| 2002/0002541 | A1 * | 1/2002 | Williams | 705/51 |
| 2002/0143612 | A1 * | 10/2002 | Barik et al. | 705/14 |
| 2004/0243468 | A1 * | 12/2004 | Cohagan et al. | 705/14 |
| 2005/0010473 | A1 * | 1/2005 | McLaughlin | 705/14 |
| 2005/0021398 | A1 * | 1/2005 | McCleskey et al. | 705/14 |
| 2005/0033657 | A1 * | 2/2005 | Herrington et al. | 705/26 |
| 2005/0211770 | A1 * | 9/2005 | Iida | 235/382 |
| 2006/0074756 | A1 * | 4/2006 | Boykin | 705/14 |
| 2006/0277098 | A1 * | 12/2006 | Chung et al. | 705/14 |
| 2007/0038931 | A1 * | 2/2007 | Allaire et al. | 715/526 |
| 2007/0067241 | A1 * | 3/2007 | Malik | 705/51 |
| 2007/0219949 | A1 * | 9/2007 | Mekikian | 707/2 |
| 2008/0133366 | A1 * | 6/2008 | Evans et al. | 705/14 |
| 2008/0201226 | A1 * | 8/2008 | Carlson et al. | 705/14 |
| 2009/0037264 | A1 * | 2/2009 | Del Favero et al. | 705/14 |
| 2009/0037266 | A1 * | 2/2009 | Weiss et al. | 705/14 |
| 2009/0157486 | A1 * | 6/2009 | Gross | 705/10 |
| 2010/0106591 | A1 * | 4/2010 | Fuzell-Casey et al. | 705/14.25 |
| 2010/0121697 | A1 * | 5/2010 | Lin et al. | 705/14.14 |
| 2011/0082729 | A1 * | 4/2011 | Carvallo et al. | 705/14.13 |
| 2011/0106613 | A1 * | 5/2011 | Felt et al. | 705/14.46 |
| 2011/0166934 | A1 * | 7/2011 | Comay et al. | 705/14.53 |

OTHER PUBLICATIONS

Tracy Wilson, "How Netflix Works", HowStuffWorks.com, all pages, May 18, 2007.*
Stephanie Crawford, "How Hulu Works", HowStuffWorks.com, all pages, Apr. 29, 2010.*

(Continued)

*Primary Examiner* — Calvin Cheung
(74) *Attorney, Agent, or Firm* — Fenwick & West LLP

(57) ABSTRACT

A determination is made regarding whether a user is allowed to access a content item. The content item is associated with a website. An offer associated with the website is identified. The offer includes a set of use-time rules specifying time periods during which the offer can be used to access content. A use-time rule is associated with a user class. A class of the user with respect to the offer is determined. The user's class indicates whether the user has accepted the offer or whether the user has registered with the website. A determination is made regarding whether the user is allowed to access the content item based on the offer, the user's class, and a current timestamp.

18 Claims, 5 Drawing Sheets

OTHER PUBLICATIONS

Ellis, J., "Moneyball and paywalls: Lessons on paid content from smaller papers," Nieman Journalism Lab, May 16, 2011, 4 pages [online] [retrieved Jul. 6, 2012] Retrieved from the internet <www.niemanlab.org/2011/05/moneyball-and-paywalls-lessons-on-paid-content-from-smaller-papers/>.

The New York Times, "Become a New York Times digital subscriber," 2012, 3 pages [online] [retrieved Jul. 6, 2012] Retrieved from the internet <www.nytimes.com/subscriptions/Multiproduct/Ip5558.html?campaignId=38869>.

Wikipedia, "Cron," Last modified Jul. 2, 2012, 9 pages [online] [retrieved Jul. 6, 2012] Retrieved from the internet <en.wikipedia.org/wiki/Cron>.

Wikipedia, "Paywall," Last modified Jun. 22, 2012, 14 pages. [online] [retrieved Jul. 6, 2012] Retrieved from the internet <en.wikipedia.org/wiki/Paywall>.

You Technology, "Using digital coupons to build sales and loyalty. What every retailer should know." Whitepaper, Jan. 2012, 10 pages, [online] [retrieved Jul. 6, 2012] Retrieved from the internet <http://corp.softcoin.com/You_Coupon_Whtppr.pdf>.

* cited by examiner

FRAMEWORK FOR SPECIFYING ACCESS TO PROTECTED CONTENT

BACKGROUND

1. Technical Field

The invention generally relates to the field of digital content and in particular to a framework for specifying access to protected digital content.

2. Background Information

A "paywall" blocks access to digital content with a dialog box, window, or page requiring payment. Websites use paywalls for various purposes, such as requiring subscriptions to access newspaper articles. A paywall can support various usage models, such as a particular number of free views per day (per user) or a particular number of free views total (per user). Specific usage models are hard-coded into existing paywall solutions. Online publishers want to try a variety of sales models and usage models and see which models best meet their needs. However, no framework exists for specifying different types of access to protected content (e.g., different usage models).

SUMMARY

The above and other issues are addressed by a computer-implemented method, non-transitory computer-readable storage medium, and computer system for determining whether a user is allowed to access a content item associated with a website. An embodiment of the method comprises identifying an offer associated with the website. The offer includes a set of use-time rules specifying time periods during which the offer can be used to access content. A use-time rule is associated with a user class. The method further comprises determining a class of the user with respect to the otter. The user's class indicates whether the user has accepted the offer or whether the user has registered with the website. The method further comprises determining whether the user is allowed to access the content item based on the offer, the user's class, and a current timestamp.

An embodiment of the medium stores executable computer program instructions for determining whether a user is allowed to access a content item associated with a website. The instructions identify an offer associated with the website. The offer includes a set of use-time rules specifying time periods during which the offer can be used to access content. A use-time rule is associated with a user class. The instructions further determine a class of the user with respect to the offer. The user's class indicates whether the user has accepted the offer or whether the user has registered with the website. The instructions further determine whether the user is allowed to access the content item based on the offer, the user's class, and a current timestamp.

An embodiment of the computer system for determining whether a user is allowed to access a content item associated with a website comprises at least one non-transitory computer-readable storage medium storing executable computer program instructions. The instructions comprise instructions for identifying an offer associated with the website. The offer includes a set of use-time rules specifying time periods during which the offer can be used to access content. A use-time rule is associated with a user class. The instructions further determine a class of the user with respect to the offer. The user's class indicates whether the user has accepted the offer or whether the user has registered with the website. The instructions further determine whether the user is allowed to access the content item based on the offer, the user's class, and a current timestamp.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
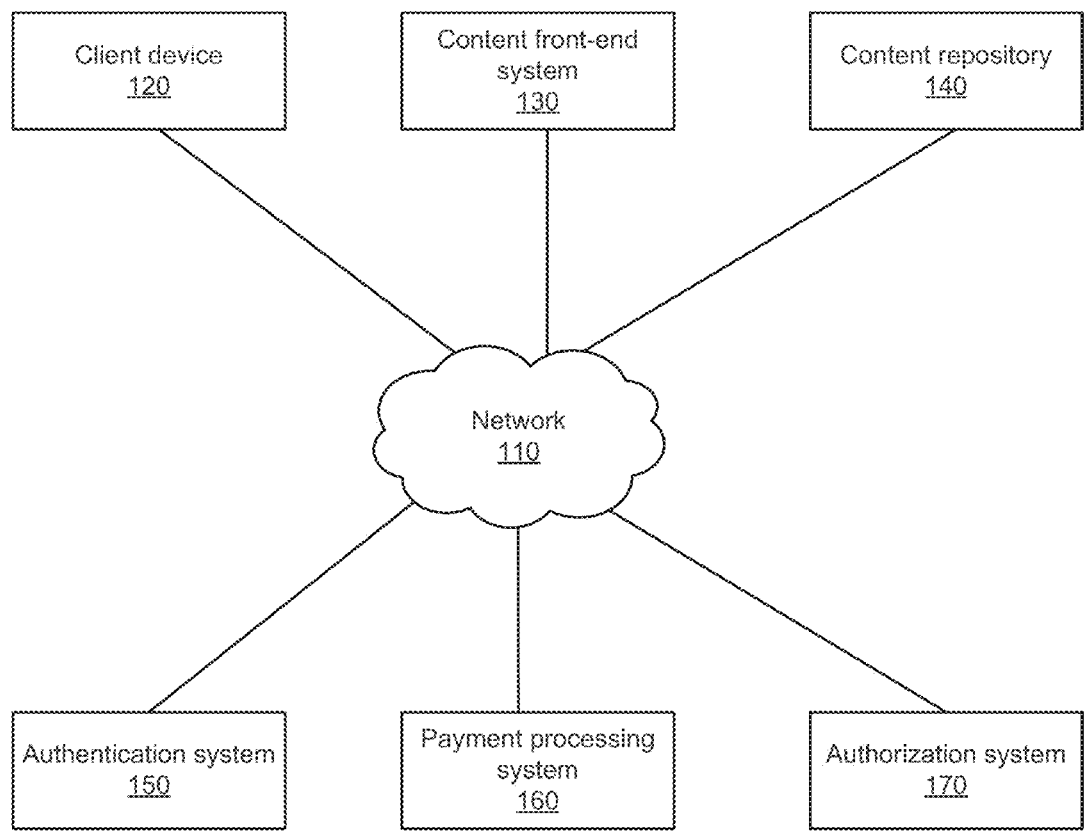
FIG. 1 is a high-level block diagram illustrating an environment for providing a framework for specifying access to protected content according to one embodiment.

FIG. 1 is a high-level block diagram illustrating an environment 100 for providing a framework for specifying access to protected content according to one embodiment. The environment 100 enables content publishers to focus on creating valuable content for their customers rather than worrying about how to charge customers for accessing the content. The environment 100 also gives consumers a simple way to easily access paid content from multiple devices and across multiple publishers through a single system.

The environment 100 may be maintained by one or more enterprises that enable access to protected content, such as corporations, universities, or government agencies. As shown, the environment 100 includes a network 110, a client device 120, a content front-end system 130, a content repository 140, an authentication system 150, a payment processing system 160, and an authorization system 170. While only one of each entity is shown in the embodiment depicted in FIG. 1 for clarity, other embodiments can have multiple client devices 120, content front-end systems 130, content repositories 140, authentication systems 150, payment processing systems 160, and/or authorization systems 170.

The network 110 represents the communication pathway between the client device 120, content front-end system 130, content repository 140, authentication system 150, payment processing system 160, and authorization system 170. In one embodiment, the network 110 uses standard communications technologies and/or protocols and can include the Internet. Thus, the network 110 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 110 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), etc. The data exchanged over the network 110 can be represented using technologies and/or formats including image data in binary form (e.g. Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities on the network 110 can use custom and/or dedicated data communications technologies instead of, or in addition to, the ones described above.

The client device 120 is a computer or other electronic device that enables a user to request digital content, perform various actions required to gain access to digital content, and experience digital content. Regarding requesting content, the client device 120 sends a request to the content front-end system 130. Regarding performing actions required to gain access to the content, the client device 120 enables a user to pay some sort of currency, register with a website, and/or login to an account. Regarding experiencing the content, if the content is visual, then the client device outputs the content using a display device. If the content is auditory, then the client device outputs the content using an audio device (e.g., a built-in speaker or output audio jack). In one embodiment, the client device 120 includes a web browser that is used to interact with various web pages. The client device 120 is further described below with reference to FIGS. 4A-C.

The content front-end system 130 receives requests for digital content and provides the requested content (if appropriate). For example, the content front-end system 130 receives a request from the client device 120 for particular content. The content front-end system 130 queries the authorization system 170 regarding whether the requestor has the appropriate permission to access the requested content. If the requestor does have the appropriate permission, then the content front-end system 130 sends the requested content to the client device 120. If the requestor does not have the appropriate permission, then the content front-end system 130 redirects the client device 120 to the authorization system 170 to complete an offer acceptance transaction.

The content front-end system 130 is a computer (or set of computers) that stores one or more processing modules and/or one or more data repositories. In one embodiment, the content front-end system 130 is operated by a content publisher (or a third party selling a publisher's content) and includes a web server that hosts the content publisher's website (or the third party's website). The content front-end system 130 is further described below with reference to FIGS. 4A-C.

The content repository 140 is a computer (or set of computers) that stores digital content. The digital content can be of any type, such as text (newspapers, magazines, books, blogs, etc.), audio (music, speeches, etc.), images (photographs, drawings, etc.), video (television shows, commercial movies, home movies, presentations, etc.), or any other type of digital file (e.g., an executable program). The content is "protected" in that the content cannot be accessed without appropriate permissions (as determined by the authorization system 170). In one embodiment, the content repository 140 includes a server that provides the content front-end system 130 access to the stored content in response to requests. In one embodiment, the content repository 140 is operated by a content publisher (or a third party selling a publisher's content) and stores content owned or licensed by the content publisher (or third party).

The authentication system 150 authenticates a user. For example, the authentication system 150 securely receives login information (e.g., an explicit user identifier ("user ID") and password) from the client device 120 and determines whether the person using the client device should be allowed to act on behalf of the identified user. If the person should be allowed to act on behalf of the identified user, then the authentication system 150 logs in the user to an account. In one embodiment, when a user logs in, a cookie is sent to the user's web browser. Future requests sent from the browser include this cookie, thereby identifying the user. The authentication system 150 is a computer (or set of computers) that stores one or more processing modules and/or one or more data repositories.

The payment processing system 160 handles payments (e.g., payments to purchase offers that require currency). The payment processing system 160 also stores information regarding which users have purchased which currency offers. Specifically, the payment processing system 160 stores associations between users and sets of offers. The payment processing system 160 functions as a map from a user ID (e.g., an explicit user ID) to a set of one or more offers (e.g., represented by offer name) purchased by that user ID. In one embodiment, the payment processing system 160 safely and securely supports credit cards, a broad range of currencies (including virtual currencies such as credits), and micro-payments. The payment processing system 160 may handle charge-backs, refunds, cancellations, and other payment processing-related issues. The payment processing system 160 may provide downloadable reports (e.g., to content publishers) containing purchase details and relevant user data. The payment processing system 160 is a computer (or set of computers) that stores one or more processing modules and/or one or more data repositories. In one embodiment, the payment processing system 160 comprises the GOGGLE CHECKOUT™ payment and billing service. The payment processing system 160 is further described below with reference to FIGS. 4A-C.

In general, the authorization system 170 determines whether a user is permitted to access content. For example, the authorization system 170 determines whether a particular user (indicated by, for example, a user ID) is permitted to access particular content (indicated by, for example, a URL) stored in the content repository 140. The user ID can be explicit or implicit. An explicit user ID is used to log in to an account, as described above with reference to the authentication system 150. An implicit user ID identifies a user (who is not logged in to an account) based on other information (e.g., Internet Protocol (IP) address and/or fingerprinting of the user's web browser). This other information is used to generate an implicit ID for the user. In one embodiment, an implicit user ID provides weak access control (even though the user's actual identity is not known) and is stored in a cookie that is sent to the user's web browser. Future requests sent from the browser include this cookie, thereby quasi-identifying the user. The authorization system 170 is a computer (or set of computers) that stores one or more processing modules and/or one or more data repositories and is further described below with reference to FIGS. 3 and 4A-C.

Figure 2:
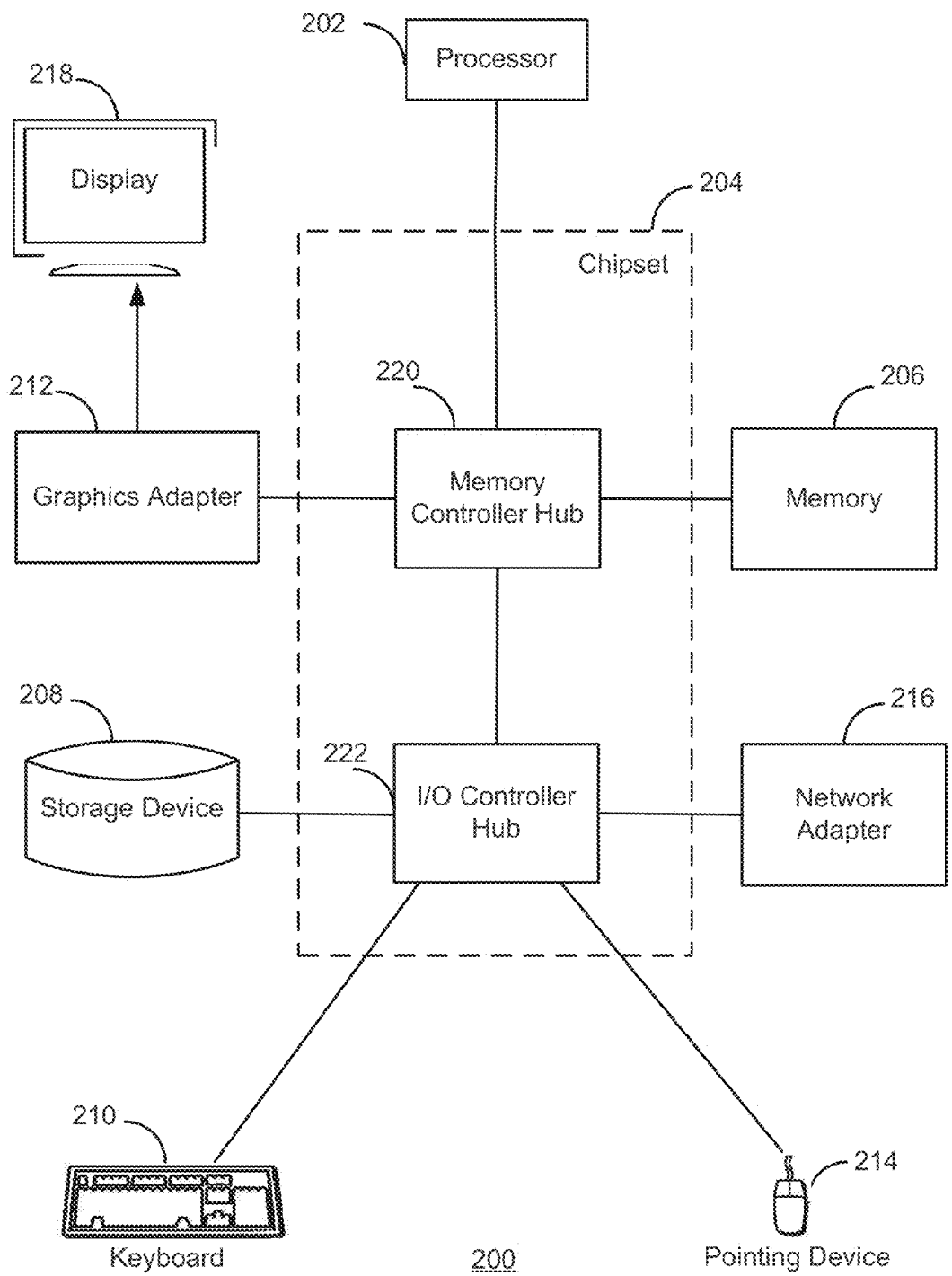
FIG. 2 is a high-level block diagram illustrating an example of a computer for use as one or more of the entities illustrated in FIG. 1, according to one embodiment.

FIG. 2 is a high-level block diagram illustrating an example of a computer 200 for use as one or more of the entities illustrated in FIG. 1 in accordance with one embodiment. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, a repository and/or a processing server can be formed of multiple blade servers and lack a display device, keyboard, and other components, while the client device 120 can be a notebook or desktop computer, a tablet computer, or a mobile phone.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
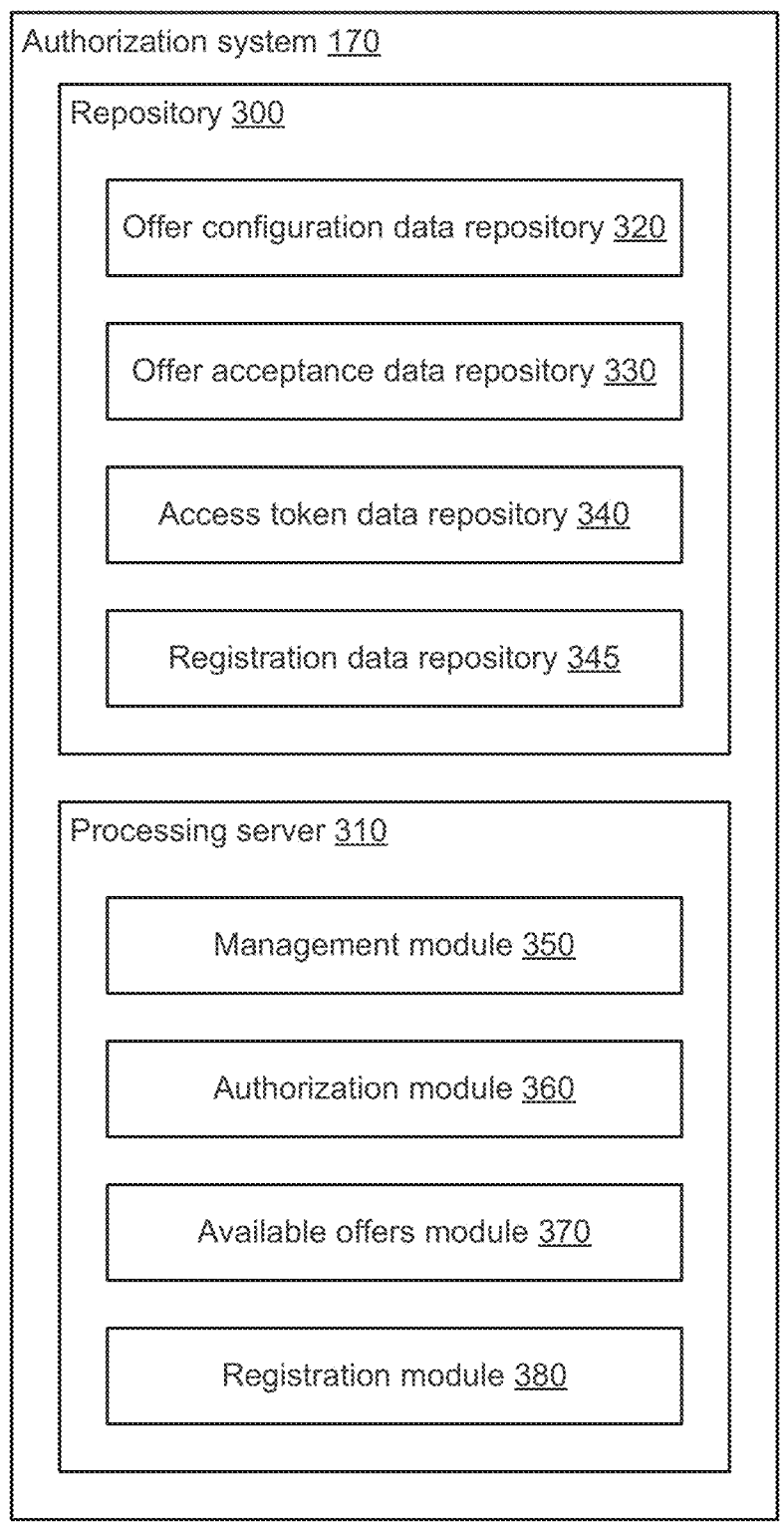
FIG. 3 is a high-level block diagram illustrating a detailed view of an authorization system, according to one embodiment.

FIG. 3 is a high-level block diagram illustrating a detailed view of an authorization system 170, according to one embodiment. The authorization system 170 includes a repository 300 and a processing server 310. The repository 300 is a computer (or set of computers) that stores an offer configuration data repository 320, an offer acceptance data repository 330, an access token data repository 340, and a registration data repository 345. In one embodiment, the repository 300 includes a server that provides the processing server 310 access to the offer configuration data repository 320, the offer acceptance data repository 330, the access token data repository 340, and the registration data repository 345 in response to requests.

The offer configuration data repository 320 stores configuration data for various offers. An "offer" specifies digital content (referred to as "offer content") that a publisher wants to sell at a certain price and under particular conditions. An instance of offer configuration data is associated with a particular website (e.g., the content publisher's website or the third party's website). Table 1 shows data items that are stored for each instance of offer configuration data according to one embodiment.

TABLE 1

Offer Configuration Data.

| Data Item Name | Data Item Description |
|---|---|
| Offer name | a human-readable name of the offer (e.g., "Premium"); is focally-unique among offers associated with a particular website; the pair <website name, offer name> is globally-unique among all offers |
| Content indicator | indicates which content items are covered by the offer; for example, can be a complete uniform resource locator (URL) to indicate a single content item or a regular expression to indicate a set of content items whose URLs match the regular expression |
| Access type | applies to offers with regular expressions in the content indicator field (for offers without a regular expression in the content indicator field, the access type field is ignored); "single" indicates access on a per-content item basis (i.e., sold individually); "total" indicates access to all content items in a set; "pay-per-URL" is similar to "single" but for rice encoded in URL |
| Payment recurrence | indicates whether payment is required only once or on a recurring basis; for recurring payment, need additional information (length of recurrence, number of recurrences, with or without automatic renewal, with or without an initial free-trial period (converts to a paid subscription if the consumer doesn't cancel)) |
| Location | indicates from which geographic location(s) the offer can be bought; for example, can be a city, a state, or a country; can be specified as a blacklist and/or a whitelist |
| Special access | indicates access for coupon holders and/or existing print subscribers |
| View limits | indicates sets of constraints put on an offer and associated with classes of users (described below) |

The various offer configuration data items and their values form a framework for specifying access to protected content, thereby enabling several different types of offers to be created. For example, the content indicator data item enables an offer to apply to one or more individual content items (e.g., by including the items' URLs) and/or to apply to a category of content (e.g., by including a regular expression). A publisher (or a third party selling a publisher's content) can use these different offers to experiment with different business models, sales models, and/or usage models. Note that the presence of the content indicator data item causes the offer configuration data repository 320 to function as a map from an offer (e.g., represented by an offer name) to a set of one or more content items (e.g., represented by URLs) to which the offer applies.

Table 2 shows exemplary instances of offer configuration data (one instance per row) according to one embodiment. In the illustrated embodiment, offer configuration data includes only four data items: name, content indicator, access type, and price. (The price is part of a "view limit," described below.) The recurrence, location, special access, and view limits data items mentioned in Table 1 are not shown. Also, a column has been added in Table 2 to provide the meaning of the offer.

TABLE 2

Exemplary Instances of Offer Configuration Data

| Name | Content indicator | Access type | Price | Meaning |
|---|---|---|---|---|
| Please | really_cool_article.html | (ignored) | $5000 | User can purchase |

TABLE 2-continued

Exemplary Instances of Offer Configuration Data

| Name | Content indicator | Access type | Price | Meaning |
|---|---|---|---|---|
| buy this! | | | | one article for $5,000. |
| Juicy News | .*juicy.html | single | $5 | Any article that ends in "juicy.html" can be purchased individually for $5. |
| Super-premium | super-premium/.* | single | $1 | Any article below "/super-premium" can be purchased individually for $1. |
| Premium | premium/.* | total | $10/month | User can access any article under "/premium" for $10/month. |
| Pay per URL | ppv/.*/pay([0-9.])+/.* | pay-per-URL | — | User can buy access to that URL for the price encoded in the URL in a default currency. For example, "/ppv/news/pay2.50/article.html" can be purchased for $2.50 in US dollars. |

In Table 2, all of the offers are associated with the same website (e.g., the content publisher's website). As a result, Table 2 roughly corresponds to the interface that a publisher user might see when logged in to the management module 350 to manage the publisher's offers.

A view limit is a set of constraints put on an offer. The various view limit constraints and their values extend the framework (formed by the offer configuration data items) for specifying access to protected content, thereby enabling even more different types of offers to be created. In one embodiment, the set of constraints includes two time periods (a sales time and a use time), a price, an active length, a view count, and a reset period. Also, a view limit is associated with a class of users (discussed below). Table 3 summarizes the constraints within a view limit according to one embodiment. The constraints are further explained below.

TABLE 3

View Limit Constraints

| Constraint Name | Constraint Description |
|---|---|
| Sales time | indicates a time period during which the offer can be sold |
| Use time | indicates a time period during which the offer can be used to access content |
| Price | indicates an action required to accept the offer |
| Active length | indicates a time period during which view limit is active |
| View count | indicates how many times a user may view a particular piece of content |
| Reset period | indicates a time period after which the number of views performed by a user should be reset to zero |

The sales time constraint indicates a time period during which the offer can be sold. The sales time constraint is useful for temporary promotions or teasers. The time period during which the temporary promotion or teaser is available for sale is indicated in the sales time constraint. One example of a sales time constraint is the time period starting at midnight on Friday and ending at midnight on Sunday. This sales time constraint can be used for an offer that is available for sale only during the weekend (e.g., "This weekend, half off one month's access"). Another example of a sales time constraint is the time period starting at midnight on Tuesday (in the appropriate time zone) and ending one month later. This sales time constraint can be used for an offer that goes on sale on Tuesday and is available for one month. In one embodiment, if the sales time constraint is not specified, then the offer can be sold anytime.

In one embodiment, a sales time constraint includes a start timestamp, an end timestamp, a time zone, and an active cron specification. The start timestamp indicates the start of the sales time period (e.g., Jun. 1, 2012, at 10am). In one embodiment, the start timestamp is specified in seconds since the Unix epoch (00:00:00 UTC on Jan. 1, 1970), and the default value is zero (thereby specifying the time of the Unix epoch). The end timestamp indicates the end of the sales time period (e.g., Jun. 2, 2012, at 10pm). In one embodiment, the end timestamp is specified in seconds since the Unix epoch, and the default value is the maximum integer ("maxint") value possible based on a device's operating system (thereby specifying a time far in the future). The time zone indicates the time zone relative to which the start timestamp and end timestamp should be interpreted (e.g., Eastern Standard Time). In one embodiment, the default value for the time zone is Coordinated Universal Time (UTC). The active cron specification further specifies when an offer is "active" for sale (i.e., when the offer can be sold). In one embodiment, an offer might be active for sale at all times between the sales time constraint's start timestamp and the sales time constraint's end timestamp. In another embodiment, an offer might be active for sale at only specific times between the start timestamp and the end timestamp (e.g., every Tuesday from 1pm to 2pm). The default value for the active cron specification can be the wildcard character ("*"), which means that the offer is active for sale "whenever" (e.g., at all times between the start timestamp and the end timestamp).

It is possible for the sales time constraint to conflict with the payment recurrence data item in Table 1. For example, the sales time can indicate that an offer is active for sale only on Tuesdays, while the recurrence can indicate that payments are to be made once per month (and, the calendar is such that the next recurrence does not fall on a Tuesday). In one embodiment, if the sales time conflicts with the recurrence, then the recurrence is adhered to, and the sales time is ignored. In this embodiment, a payment is processed when the recurrence specifies to do so, regardless of whether the offer is active for sale at that time. This avoids user confusion and keeps user bound by the terms that were present at the time of offer acceptance.

The use time constraint indicates a period during which the offer can be used to access content. The use time constraint is useful for offers that can be used only during a particular time period. The time period during which the offer is available for use is indicated in the use time constraint. One example of a use time constraint is the time period starting at midnight on Friday and ending at midnight on Sunday. This use time constraint can be used for an offer that can be used only during the weekend (e.g., "Viewable Saturday-Sunday as a Weekend Edition"). Another example of a use time constraint is the time period starting at midnight on Tuesday (in the appropriate time zone) and ending one month later. This use time constraint can be used for an offer that can be used starting Tuesday for one month. In one embodiment, if the use time constraint is not specified, then the offer can be used anytime.

In one embodiment, a use time constraint includes a start timestamp, an end timestamp, a time zone, and an active cron specification. The start timestamp indicates the start of the use time period (e.g., Jun. 1, 2012, at 10am). In one embodiment, the start timestamp is specified in seconds since the Unix epoch, and the default value is zero (thereby specifying the time of the Unix epoch). The end timestamp indicates the end of the use time period (e.g., Jun. 2, 2012, at 10pm). In one embodiment, the end timestamp is specified in seconds since the Unix epoch, and the default value is the maxint value possible based on a device's operating system (thereby specifying a time far in the future). The time zone indicates the time zone relative to which the start timestamp and end timestamp should be interpreted (e.g., Eastern Standard Time). In one embodiment, the default value for the time zone is UTC. The active cron specification further specifies when an offer is "active" for use (i.e., when the offer can be used to access content). In one embodiment, an offer might be active for use at all times between the use time constraint's start timestamp and the use time constraint's end timestamp. In another embodiment, an offer might be active for use at only specific times between the start timestamp and the end timestamp (e.g., every Tuesday from 1pm to 2pm). The default value for the active cron specification can be the wildcard character ("*"), which means that the offer is active for use "whenever" (e..g., at all times between the start timestamp and the end timestamp).

The price constraint indicates an action required to accept the offer. One type of action involves payment of currency (e.g., using the payment processing system 160). The price constraint in this situation would be an amount of currency (i.e., cost) required to purchase the offer (e.g., $10 in U.S. dollars). The price constraint can be specified in any sort of currency, including virtual currencies such as credits. If an offer specifies that access to a content item is free, then the price constraint equals zero. Another type of action does not involve payment of currency, such as completing a survey or registering with a website. In one embodiment, the price constraint includes a time period (e.g., $10/month or 1 survey/month).

The active length constraint indicates a time period during which the view limit is active (i.e., during which the offer as specified by the view limit is active) (e.g., 24 hours or 7 days). After this time period has elapsed, the view limit is no longer active (e.g., the view limit is "expired") and cannot be used to access content. In one embodiment, the active length constraint is specified in seconds relative to when the user pays (for Paid or Expired users, described below) or registers (for Registered users, described below). For example, an active length constraint of 3600 seconds means that the view limit is active for one hour (3600 seconds) starting when the user pays or registers. After that hour has elapsed, the view limit is expired (i.e., no longer active) and cannot be used to access content. In one embodiment, if the active length constraint is not specified, then the length of recurrence (part of the payment recurrence data item in Table 1) is used as the time period during which the view limit is active. For example, if the length of recurrence is one month (such that payments are to be made once per month), then the view limit would be active for one month starting when the user pays or registers.

The view count constraint indicates how many times a user may view content (e.g., the content specified by the content indicator data item). In one embodiment, a view count of zero means that a user may view content an unlimited number of times. A page refresh of content may count as a view.

The reset period constraint indicates a time period after which the number of views performed by a user should be reset to zero (if ever), thereby "renewing" the offer. In one embodiment, a reset period is specified in seconds. A reset period of zero may mean that the number of views performed by a user should never be reset to zero. The number of views performed by a user is stored in the access token data repository 340 as the tokens used number.

Recall that a view limit is associated with a class of users. In one embodiment, user classes include Paid, Expired, Registered, Logged-in, Logged-out, and Any. The Paid class includes users who have accepted an offer that has a price indicating payment of currency and that is active for use. The Expired class includes users who used to be Paid users but have allowed the paid currency offer to expire (such that the offer is no longer active for use). In one embodiment, "Expired" is an attribute that is granted with respect to a single offer (e.g., because the user allowed that offer to expire) but applies to an entire website (e.g., a content publisher's website or a third party's website). Specifically, if a user paid for one or more currency offers in the past associated with a particular website and has since allowed all of the paid offers (associated with that website) to expire, then the user is in the "Expired" class for all offers associated with that website, even offers that the user had not previously paid for. The Registered class includes users who have registered with a website associated with the offer. Registration is further described below with reference to the registration data repository 345.

A user belongs to the Logged-in class before registering and becoming part of the Registered class. The Logged-in class includes users who are logged in to an account (e.g., using an explicit user ID). The Logged-out class includes users who are not logged in to an account but who are being identified based on other information (e.g., an implicit user ID, as explained above with reference to the authorization module 170). The Any class includes all users, including users who are neither logged in nor identified based on other information.

The user classes relate to each other as follows: Logged-out is a disjoint set from Logged-in. Registered is a subset of Logged-in. Registered is the union of Paid, Expired, and free registration (e.g., a zero-price offer). Any is the union of all other user classes (Logged-out, Logged-in, Registered, Expired, and Paid). Note that some of the user classes are not mutually exclusive. A Paid user is, by definition, a Registered user. An Expired user is, by definition, a Registered user. A Registered user is, by definition, a Logged-in user. Also, an Any user can be a Paid user, an Expired user, a Registered user, a Logged-in user, or a Logged-out user. In one embodiment, if a user class is not associated with a view limit, then the user class for that view limit is assumed to be Paid. Note that a single user can be in different classes with respect to different offers. For example, the user can be a Paid user with respect to a first offer and an Expired user with respect to a second offer. In one embodiment, a maximum of one view limit can be specified per user class.

The various view limit constraints and their values enable several additional different types of offers to be created. The following examples demonstrate how various constraints and values can be used to create offers, in particular the two time period constraints (sales time and use time), the active cron specification (part of the sales time constraint and/or the use time constraint), and the user class associated with a view limit.

N content items free for registered users, then user must pay—The user is initially denied access to content (even if he is logged in). The user must "register" by fulfilling the registration requirements of the website offering the content (discussed below with reference to the registration data repository 345). Once logged in and registered, the user can view up to N URLs, each of which corresponds to a content item. ("N" is a predetermined number.) After the N URLs are exhausted, access is denied. (Upon the next request for a content item, the authorization system 170 returns the current set of offers that the user can use to access the requested content item, which may differ from the offers that were available when the user originally registered.) In one embodiment, this offer is implemented by creating a view limit (with the view count constraint set to N and the reset period constraint set to 0) and associating the view limit with the Registered user class. In another embodiment, two offers are used: one offer for Registered users and one offer for Paid users. Both approaches work. The single-offer approach requires a "free views" field that keeps track of how many free views the user has left.

N content items/time period free for registered users, then user must pay—This is similar to the "N content items free for registered users, then user must pay" offer described above, except that the authorization system 170 may grant more access tokens if the previous time period (e.g., a "day") has ended and a new time period has begun. Note that the effect of this implementation is more like "no more than N views per time period, on average." Consider the following scenario: 1) User signs up at noon one day for N content items/day registration. 2) User does nothing for two days. 3) User reads N content items before noon. 4) Day period rollover occurs. 5) User reads N content items after noon. The net result is that the user has now read N+N content items in "one day." In one embodiment, to avoid this situation, the "rollover time" is set at midnight in the user's local time zone.

X content items/time period free for anybody, Y content items/time period free for registered users, Z content items/time period free for paid users—All users (the Any class) are granted access to X URLs per time period. Registered users (the Registered class) are granted access to Y URLs per time period. Paid users (the Paid class) are granted access to Z URLs per time period. (Each URL corresponds to a content item, and X, Y, and Z are predetermined numbers.)

All content items free for registered users—A registered user is granted access to all content items. In one embodiment, this offer is implemented by creating a view limit (with the view count constraint set to zero (i.e., unlimited)) and associating the view limit with the Registered user class.

All content items free from time X to time Y ("happy hour")—All users are granted unlimited access from time X (e.g., 5pm EST) to time Y (e.g., 6pm EST). In one embodiment, this offer is implemented by creating a view limit (with the price constraint set to zero, the view count constraint set to zero, and the use time constraint set to time X to time Y (e.g., by setting the time zone to EST and the active cron specification to 5-6pm daily)), and associating the view limit with the Any user class.

A promotional offer that goes on sale on future date X for a specified time period—In one embodiment, this offer is implemented by creating a view limit with the sales time constraint set to a start timestamp of midnight on future date X (e.g., next Tuesday) in the appropriate time zone and an end timestamp one time period (e.g., one month) later. (The active cron specification is not included.)

Buy access for only particular days of the week—In one embodiment, this offer is implemented by creating a view limit with the use time constraint set to an active cron specification in the publisher's time zone that matches the specified days of the week (e.g., Saturday and Sunday for a "weekend edition"). The offer can be sold at any time, so the view limit's sales time constraint is undefined.

Try for a month at half price ("teaser")—In one embodiment, this offer is implemented in a "one-off" manner by creating a view limit with the sales time constraint set to a desired month and the use time constraint set to an end timestamp of one month after the sales time constraint's end timestamp (thereby limiting the use of the offer to at most one month). A new one-off offer is created for each month (if desired). The payment recurrence data item is not set, thereby preventing users from renewing at the end of the offer period. A more general approach is to add a "renewal offer" data item to the offer configuration data. The offer specified in the renewal offer data item is the offer used for renewal, rather than the current offer. A renewal offer data item enables the creation of chains of offers like "first N months at half price, then regular price" or "every Nth month free."

Additional types of offers that can be created include, for example, "half price access, this Friday only!" and "this weekend, half off one month's access."

In one embodiment, offer configuration data within the offer configuration data repository 320 is organized as a table with multiple rows (one row per offer) and one column (configuration data for each offer). A row in this table is keyed by the pair <URLtoKey(website name), offer name>, where the function URLtoKey(website name) reverses the order of the website name parts, and where the website name does not include the protocol (e.g., "foo.com" instead of "http://foo.com"). For example, URLtoKey("example.com") outputs "com.example".

In one embodiment, configuration data for each offer adheres to the Protocol Buffer format from the Google Code API and includes the following information: a string indicating the offer name (redundant information given the row key, but can be useful for error checking), a string indicating the content indicator, an enumeration indicating the access type, and a protocol buffer indicating the price (encapsulating a price specification, similar to that used by the payment processing system 160). In this embodiment, there is no concept of an internal identifier for an offer. The stock-keeping units (SKUs) used by the payment processing system 160 are the <website name, offer name> pairs (for offers with an access type of "total") and the URLs themselves (for offers with an access type of "single" or whose content indicator fields contain URLs instead of regular expressions) and are visible to a publisher user.

In another embodiment, offers whose content indicator fields contain URLs (i.e., indicate single content items) are stored in a first "exact match" table, and offers whose content indicator fields contain regular expressions (i.e., indicate sets of content items) are stored in a second "regexp" table. In this embodiment, a single row lookup for a URL in the "exact match" table might avoid the need for execution of several regular expressions, which are computationally expensive.

The offer acceptance data repository 330 stores acceptance data for various offers. Specifically, the offer acceptance data repository 330 stores associations between users and sets of offers. The offer acceptance data repository 330 functions as a map from a user ID (explicit or implicit) to a set of one or more offers (e.g., represented by offer name) accepted by that user ID. An accepted offer is associated with a particular website (e.g., the content publisher's website or the third party's website) and can be identified based on a website name key. Recall that an offer's price constraint indicates an action required to accept the offer, and the action may or may not involve payment of currency. In one embodiment, the offer acceptance data repository 330 stores acceptance data for offers that do not involve payment of currency, and the payment processing system 160 stores acceptance data for offers that do involve payment of currency.

The access token data repository 340 stores access token data for various users. A particular access token is used to access a particular content item. In one embodiment, a token is specified as a 32-bit integer that includes a hash of the following information: a string indicating the URL to which the token grants access, a string indicating the user ID (explicit or implicit) for which the token was generated (which can be omitted), a creation time, an expiration time, and (optionally) a signature (described below with reference to FIG. 4C). A timestamp may be specified as a 64-bit integer. Access tokens are further described below with reference to FIG. 4C.

In one embodiment, access token data is stored in the access token data repository 340 in key-value attribute format and is keyed by offer ID (e.g., a <website name, offer name> pair) and by user ID (explicit or implicit). The access token data for a particular offer and user may include a user class (e.g., Paid, Expired, Registered, Logged-in, Logged-out, or Any), a number specifying a count of how many tokens have been granted for the particular offer and user and user class, a number specifying a count of how many tokens have been used for the particular offer and user and user class, and (optionally) a timestamp indicating when the set of tokens (indicated by the granted tokens number) was granted. In one embodiment, access token data is used to check view limit constraints and/or perform abuse detection, as described below with reference to step 5 in FIG. 4C.

The registration data repository 345 stores registration requirements for various websites and indications of which users have registered with which websites. For example, the registration data repository 345 stores associations between websites and registration requirements. A user registers with a website (thereby becoming a Registered user) by fulfilling that website's registration requirements. A registration requirement is, for example, acceptance of Terms of Service and/or an information sharing policy. Thus, in one embodiment, a user becomes a Registered user by viewing and agreeing to Terms of Service and/or an information sharing policy. In this embodiment, the registration data repository 345 stores the Terms of Service and the information sharing policy in association with the website.

The registration data repository 345 also stores associations between users and websites. The registration data repository 345 functions as a map from a user ID (e.g., an explicit user ID) to a set of one or more websites with which that user ID has registered.

The processing server 310 includes various modules such as a management module 350 for managing offers, an authorization module 360 for determining whether a user is allowed to access content, an available offers module 370 for determining which offers provide access to content, and a registration module 380 for registering users. In one embodiment, the processing server 310 includes a computer (or set of computers) that communicates with the repository 300 and processes data (e.g., by executing the management module 350, the authorization module 360, the available offers module 370, and the registration module 380). In one embodiment, the processing server 310 includes a web server that responds to requests from the content front-end system 130 and sends requests to the payment processing system 160.

The management module 350 enables the management of offers. In one embodiment, the management module 350 provides an easy-to-use graphical user interface that enables a publisher user to create, modify, and delete offers in real-time. (Note that deleting an offer can be problematic because 1) users may have already accepted that offer and not used it yet and 2) the offer has not yet expired.) These offers are stored as offer configuration data in the offer configuration data repository 320 in association with an indication of the publisher's website. The management module 350 may provide aggregated order summary reports (e.g., to content publishers) with data on subscriptions, charges, refunds, and charge-backs. For example, the management module 350 enables a publisher user to indicate an existing offer and be shown a report associated with that offer. The management module 350 may enable Terms of Service and/or an information sharing policy to be uploaded to the repository (e.g., to the registration data repository 345) and associated with a particular website (e.g., a content publisher's website or a third party's website).

The authorization module 360 determines whether a user is allowed to access content. For example, the authorization module 360 determines whether a particular user (e.g., indicated by a user ID, explicit or implicit) is allowed to access particular content (e.g., indicated by a URL). Stated another way, the authorization module 360 determines whether an offer S exists such that: 1) S gives access to the URL (i.e., S "maps" to the URL given the offer configuration data) and 2) the user ID has accepted S (i.e., the user ID "maps" to S given the offer acceptance data).

Using mathematical set notation, let URLMap[s] be the set of URLs to which offer "s" provides access, and let UserMap [g] be the set of offers which the user ID "g" has accepted. Then, a user (represented by user ID g) is allowed to access a content item (represented by URL u) if an offer S exists such that 1) the URL u ∈ URLMap[S] and 2) S ∈ UserMap[g]. In one embodiment, the authorization module 360 calculates S. However, the calculation of S is not strictly necessary to answer the yes/no access question. (Some methods of performing set operations based on cryptographic hashes produce yes/no answers without actually calculating S.)

Operation of the authorization module 360 is described below with reference to FIG. 5.

The available offers module 370 determines which offers provide access to content. Specifically, the available offers module 370 determines which offers (e.g., indicated by offer name) provide access to particular content (e.g., indicated by a URL). To do this, the available offers module 370 queries the offer configuration data repository 320 using the URL. In one embodiment, the available offers module 370 1) extracts the website name from the URL (e.g., extracts "example-.com" from "http://example.com/foo.html"); 2) converts the website name using the function URLtoKey (e.g., converts "example.com" to "com.example"); 3) queries the offer configuration data repository 320 using the converted website name (e.g., performs a prefix scan on the offer configuration data using the converted website name) to identify offers associated with the website; 4) within the identified offers, compares the content item's URL to the content indicator items in the offers (which include a complete URL and/or a regular expression) to find offers that match the URL; and 5) returns all offers that match.

The registration module 380 registers users and determines which users have registered with which websites. In one embodiment, the registration module 380 registers a particular user with a particular website as follows: The registration module 380 receives a request to register a particular user with a particular website. The registration module 380 obtains, from the registration data repository 345, Terms of Service and/or an information sharing policy associated with the particular website. The registration module 380 then sends the Terms of Service and/or information sharing policy to a client device 120, where they are displayed to the particular user. The registration module 380 then receives, from the client device 120, an indication that the user agrees to the Terms of Service and/or information sharing policy. The registration module 380 then stores, in the registration data repository 345, an association between the particular user and the particular website.

In one embodiment, the registration module 380 determines which users have registered with which websites as follows: The registration module 380 receives a query regarding whether a particular user has registered with a particular website. The registration module 380 checks the registration data repository 345 for an association between the particular user and the particular website. If such an association is found, then the registration module 380 determines that the particular user has registered with the particular website. If such an association is not found, then the registration module 380 determines that the particular user has not registered with the particular website.

Figure 4A:
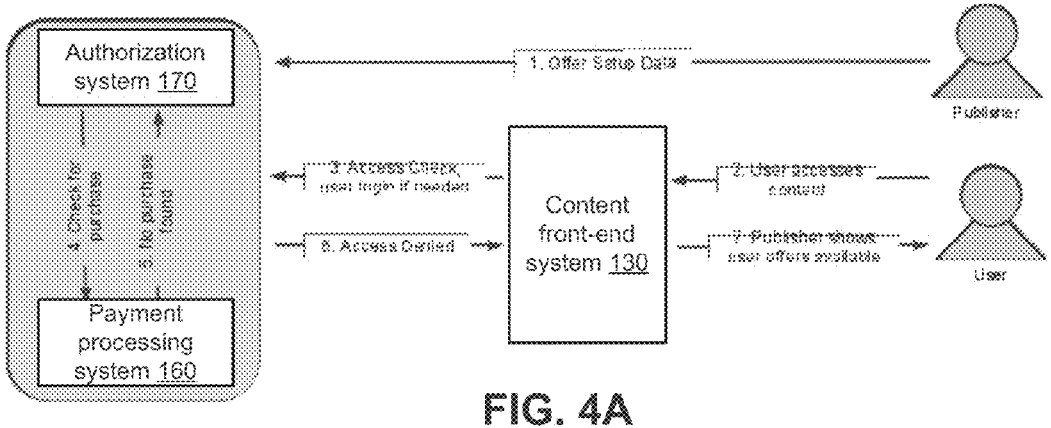
FIG. 4A is a conceptual diagram illustrating steps involved in showing a user available offers according to one embodiment.

FIG. 4A is a conceptual diagram illustrating steps involved in showing a user available offers according to one embodiment. In step 1, a publisher sends offer setup data (offer configuration data) to the authorization system 170, thereby notifying the authorization system 170 of various offers associated with that publisher. In step 2, a user attempts to access content by sending a request from the client device 120 to the content front-end system 130. In step 3, the content front-end system 130 queries the authorization system 170 regarding whether the user is allowed to access the requested content. (If desired, the user logs in to an account using the client device 120 so that the user is part of the Logged-in class rather than the Logged-out class. If the user does not have an account, then the user is able to create one if desired.) In step 4, the authorization system 170 determines whether the user has accepted an offer granting access to the requested content (e.g., by querying the offer acceptance data repository 330 and/or the payment processing system 160). The authorization system 170 determines that the user has not accepted an offer granting access to the requested content. In step 5, if necessary, the payment processing system 160 notifies the authorization system 170 that the user has not accepted an offer granting access to the requested content. (In another embodiment, not shown, steps 4 and 5 are replaced by the method illustrated in FIG. 5.) In step 6, the authorization system 170 notifies the content front-end system 130 that the user is not allowed to access the requested content and sends to the content front-end system 130 a list of offers that are available for the user to accept in order to access the requested content. In one embodiment, the list sent by the authorization system 170 is equivalent to the list returned by step 520 in FIG. 5. In another embodiment, the list sent by the authorization system 170 is based on the list returned by step 520 in FIG. 5 but offers whose sales time constraints do not cover the current timestamp are removed. In this way, the list returned by step 520 in FIG. 5 is filtered to include only those offers whose sales time constraints include the current timestamp (i.e., only those offers that are currently active for sale). In step 7, the content front-end system 130 sends to the client device 170 the list of offers.

Figure 4B:
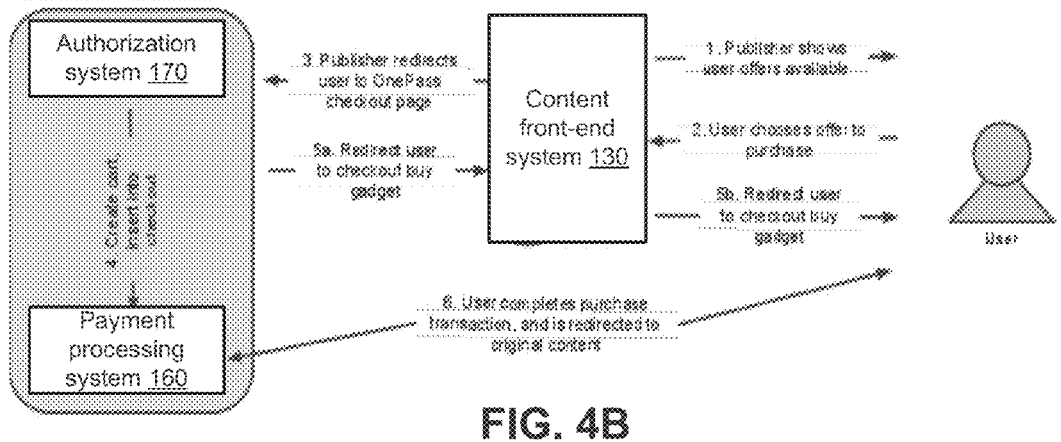
FIG. 4B is a conceptual diagram illustrating steps involved in a user accepting an offer according to one embodiment.

FIG. 4B is a conceptual diagram illustrating steps involved in a user accepting an offer according to one embodiment. In step 1, the content front-end system 130 sends to the client device 120 a list of offers that are available for the user to accept in order to access the requested content. (This step is equivalent to step 7 in FIG. 4A.) In step 2, the user chooses an offer to accept. The client device 120 sends an indication of the chosen offer to the content front-end system 130. In step 3, the content front-end system 130 redirects the client device 120 to an acceptance page associated with the authorization system 170. In one embodiment, the authorization system 170 determines whether the user has registered with that offer's website (e.g., by querying the registration module 380). If the user tries to accept an offer and the user has not registered with that offer's website, then the user is prompted to first register with the website before completing the acceptance. For example, the registration module 380 enables the user to register with the website by fulfilling the registration requirements of the website (e.g., indicated by the registration data repository 345). In step 4, if necessary, the authorization system 170 creates a virtual shopping cart that includes the chosen offer and sends the cart to the payment processing system 160. In step 5a, the authorization system 170 instructs the content front-end system 130 to redirect the client device 120 to an acceptance page associated with the authorization system 170. In step 5b, the content front-end system 130 redirects the client device 120 to the acceptance page associated with the authorization system 170. In step 6, the user uses the client device 120 to complete the acceptance transaction with the authorization system 170. (If the offer's price involves payment of currency, then the client device 120 uses the virtual shopping cart and the payment processing system 160 to complete the acceptance transaction.) The authorization system 170 then redirects the client device 120 to the list of offers received in step 1.

Figure 4C:
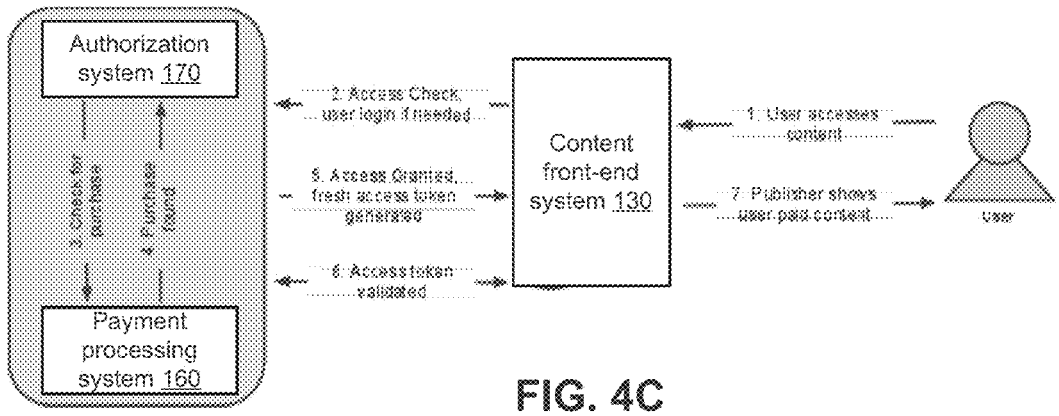
FIG. 4C is a conceptual diagram illustrating steps involved in a user accessing offered content (after acceptance) according to one embodiment.

FIG. 4C is a conceptual diagram illustrating steps involved in a user accessing offered content (after acceptance) according to one embodiment. In step 1, a user attempts to access content by sending a request from the client device 120 to the content front-end system 130. (This step is equivalent to step 2 in FIG. 4A.) In step 2, the content front-end system 130 queries the authorization system 170 regarding whether the user is allowed to access the requested content. (If desired, the user logs in to an account using the client device 120 so that the user is part of the Logged-in class rather than the Logged-out class.) (This step is equivalent to step 3 in FIG. 4A.) In step 3, the authorization system 170 determines whether the user has accepted an offer granting access to the requested content (e.g., by querying the offer acceptance data repository 330 and/or the payment processing system 160). (This step is equivalent to step 4 in FIG. 4A.) The authorization system 170 determines that the user has accepted an offer granting access to the requested content. In step 4, if necessary, the payment processing system 160 notifies the authorization system 170 that the user has accepted an offer granting access to the requested content. (In another embodiment, not shown, steps 3 and 4 are replaced by the method illustrated FIG. 5.) In step 5, the authorization system 170 notifies the content front-end system 130 that the user is allowed to access the requested content, generates an access token (referred to as "token generation"), and sends the access token to the content front-end system 130.

In one embodiment (not shown), the authorization system 170 obtains data from the access token data repository 340 and analyzes the data before generating the access token. This data analysis can include, for example, checking view limit constraints and/or performing abuse detection. Recall that access token data is specific to a particular user and a particular offer and includes, in one embodiment, a user class, a tokens granted number, a tokens used number, and (optionally) a granted timestamp. Checking view limit constraints is described below with reference to step 550 in FIG. 5.

Regarding abuse detection, if the tokens granted number is significantly larger than the number of tokens available from all offers accepted by a user (as indicated by the offer acceptance data repository 330 and/or the payment processing system 160) or if a user is causing a significant number of tokens to be created (as indicated by the tokens granted number), then it is likely that the user is doing something malicious. For example, the user might have a website that is proxying requests to a protected webpage so that anybody can access the webpage using the user's accepted offer. In one embodiment, if abuse is detected, then the authorization system 170 does not generate the access token.

In one embodiment (not shown), the access token is signed, encrypted, ASCII-armored, and/or compressed before it is sent to the content front-end system 130. Signing the token prevents users from giving themselves access to content. Encrypting the token prevents exposure of internal data such as the user ID. In one embodiment, the encryption key is the URL for the requested content. ASCII-armoring (web-safe base-64 encoding) the token enables the token to be passed around in URLs safely. Compressing the token creates a fixed bound on the size of the token. In one embodiment, the token is computed using a hash of the URL and/or a hash of the user ID instead of the raw URL and raw user ID. The hash function is, e.g., a 64-bit fingerprint function. With no further packing or compression, the result is tokens that are about 100 bytes long.

In step 6, the content front-end system 130 validates the access token with the authorization system 170 (referred to as "token checking"). For example, the content front-end system 130 sends the access token and the URL for the requested content to the authorization system 170 and queries the authorization system 170 regarding whether the access token allows access to that URL. (Note that since the URL within the token and the URL sent separately by the content front-end system 130 must match, the URLs should be in canonicalized form. Session IDs or other modifications to the URLs will prevent the URLs from matching, and access will be denied.) The access token is validated (i.e., the access token does allow access to the URL).

In step 7, the content front-end system 130 sends to the client device 120 the requested content. Note that after the user has logged in with the appropriate permissions, the content browsing experience is seamless across paid and free content.

Figure 5:
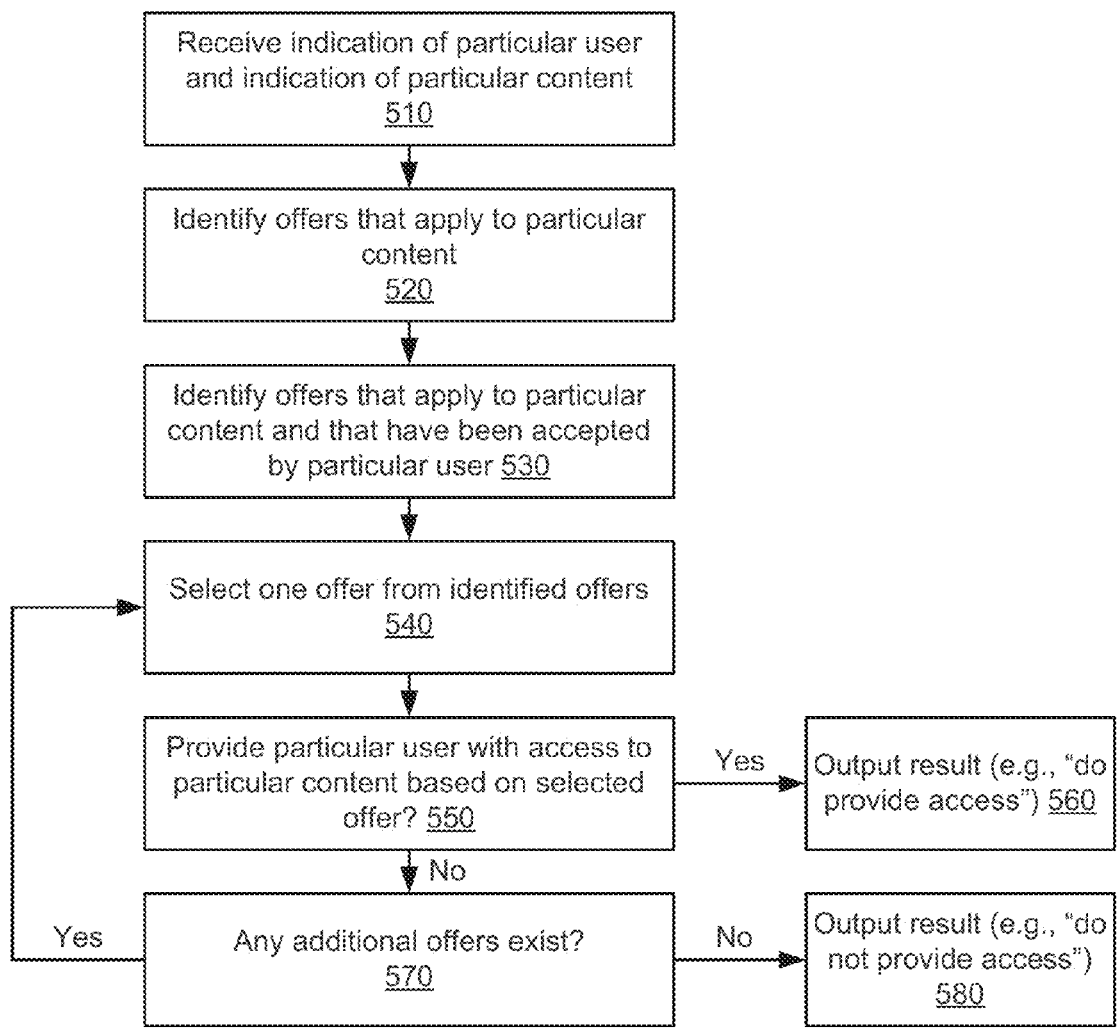
FIG. 5 is a flowchart illustrating a method of determining whether a particular user is allowed to access particular content according to one embodiment.

FIG. 5 is a flowchart illustrating a method 500 of determining whether a particular user is allowed to access particular content according to one embodiment. Other embodiments can perform the steps in different orders and can include different and/or additional steps. In addition, some or all of the steps can be performed by entities other than those shown in FIGS. 1 and 3.

When the method 500 starts, the content front-end system 130 has already sent a query to the authorization system 170 regarding whether a particular user is allowed to access particular content (e.g., see step 3 of FIG. 4A and step 2 of FIG. 4C). For example, the content front-end system 130 has already sent the authorization system 170 an indication of the particular user (e.g., a user ID, explicit or implicit) and an indication of the particular content (e.g., a URL). At this point, the method 500 begins.

In step 510, an indication of the particular user and an indication of the particular content are received. For example, the authorization module 360 receives a user ID and a URL that the content front-end system 130 sent to the authorization system 170.

In step 520, offers that apply to the particular content are identified. For example, the authorization module 360 uses the available offers module 370 to determine which offers (e.g., indicated by offer name) provide access to particular content (e.g., indicated by a URL).

In one embodiment, the authorization module 360 maintains a per-user offers cache. The cache stores, in memory, the last N offers used by a user. In this embodiment, the authorization module 360 checks this cache for an appropriate offer (i.e., an offer that grants access to the requested content) before using the available offers module 370 as described above. In one embodiment, the expiration time in the cache is specified by the publisher (or third-party seller) of the relevant content.

In step 530, offers that apply to the particular content and that have been accepted by the user are identified. In particular, the offers that apply to the particular content (identified in step 520) are checked regarding whether the user has accepted any of them. For example, the authorization module 360 queries the offer acceptance data repository 330 and/or the payment processing system 160. In one embodiment, the authorization module 360 queries the payment processing system 160 in two phases (possibly performed in parallel). In the first phase, the authorization module 360 determines whether the user accepted an offer granting access to the content item as a single article (i.e., whether the user accepted a currency payment offer containing a complete URL that matches the content item's URL). To do this, the authorization module 360 queries the payment processing system 160 with the user ID and the SKU (the content item's complete URL).

In the second phase, the authorization module 360 determines whether the user accepted an offer whose regular expression matches the content item's URL. To do this, the authorization module 360 1) extracts the website name from the URL (e.g., "http://example.com/foo.html"); 2) converts the website name (e.g., "example.com") using the function URLtoKey; and 3) queries the payment processing system 160 with the user ID and the SKU (the <website name, offer name> pair; the offer name is obtained from the list of offers generated in step 520). Note that once an offer is found that was accepted by the user, the authorization module 360 has determined that the user is allowed to access the URL, and the authorization module 360 need no longer query the offer acceptance data repository 330 and/or the payment processing system 160.

In step 540, one offer is selected from the offers identified in step 530. The selected offer is associated with one or more sets of constraints (referred to as "view limits"). A set of constraints is associated with a user class and includes a rule specifying use times, which indicates a time period during which the selected offer can be used to access content. In one embodiment, the authorization module 360 selects an offer that includes a view limit associated with the Paid user class (if such an offer exists) before the authorization module 360 selects an offer that does not include a view limit associated with the Paid user class. In this embodiment, offers that require payment of currency are processed first.

In step 550, a determination is made regarding whether to provide the particular user with access to the particular content based on the selected offer. Step 550 is further described below.

If a determination is made to provide the particular user with access to the particular content based on the selected offer, then the method proceeds to step 560. In step 560, a determination result is output (e.g., "do provide access").

If a determination is made not to provide the user with access to the particular content based on the selected offer, then the method proceeds to step 570. In step 570, a determination is made regarding whether any additional offers exist (specifically, whether any additional offers exist that were identified in step 530 but have not yet been evaluated with respect to step 550). If any additional offers do exist, then the method returns to step 540, where an additional offer is selected. If no additional offers exist, then the method proceeds to step 580, where a result is output (e.g., "do not provide access").

Step 550 is now described in further detail. Recall that one user can be a member of multiple classes with respect to the same offer. For example, one user can be in both the Any class and the Logged-out class or in both the Logged-in class and the Registered class. In step 550, one or more classes of the particular user with respect to the selected offer are determined. For example, the authorization module 360 determines whether the particular user's class with respect to the selected offer is Paid, Expired, Registered, Logged-in, Logged-out, and/or Any.

In one embodiment, the authorization module 360 determines the user's class as follows: The user is always a member of the Any class. If the user has not logged in (as indicated by the presence of an appropriate web browser cookie), then the user is a member of the Logged-out class. If the user has logged in (as indicated by the presence of a different appropriate web browser cookie), then the user is a member of the Logged-in class. If the user has registered with the website (as indicated by querying the registration module 380), then the user is a member of the Registered class.

With respect to the Paid class and the Expired class, the view limit of the selected offer that is associated with the Paid user class must have a currency payment price, and the user must have accepted the selected offer (as indicated by the payment processing system 160). If the view limit of the selected offer that is associated with the Paid user class is currently valid (i.e., not expired), then the user is a member of the Paid class. If the view limit of the selected offer that is associated with the Paid user class is currently invalid (i.e., expired), then the user is a member of the Expired class. In one embodiment, the view limit can be expired based on the current timestamp. For example, if the current timestamp does not fall within the active length constraint or if the current timestamp does not fall within the use time constraint, then the view limit is expired. The view limit can also be expired based on access token data (stored in the access token data repository 340). For example, if the relevant access token data's tokens used number is greater than or equal to the access token data's tokens granted number, this means that the user has reached the view count limit, and the view limit is expired.

Recall that, in one embodiment, "Expired" is an attribute that is granted with respect to a single offer but applies to an entire website (e.g., a content publisher's website or a third party's website). In this embodiment, if the user is a member of the Expired class with respect to a single offer (as described above), then an "expired" bit associated with that website is set. After all of the offers have been processed (see step 570), the value of this "expired" bit indicates whether the user is a member of the Expired class.

One set of constraints ("view limit") is selected from the selected offer. For example, the authorization module 360 selects the set of constraints associated with a user class that matches the user's class. Since one user can be a member of multiple classes, it is possible that more than one set of constraints is associated with a user class that matches the user's class. In one embodiment, the set of constraints associated with the most specific matching class is selected. User classes ordered based on their specificity, from most-specific to least-specific, are as follows: Paid, Expired, Registered, Logged-in, Logged-out, and Any. Consider the situation where a user is a member of both the Registered class and the Logged-in class, and there are two sets of constraints (one associated with the Registered class and one associated with the Logged-in class). In this situation, there are two matching classes: Registered and Logged-in. The set of constraints associated with the Registered class is selected because the Registered class is more specific than the Logged-in class.

A determination is made regarding whether to provide the particular user with access to the particular content based on the selected offer. In one embodiment, the authorization module 360 makes this determination based on the use-time rule (part of the selected set of constraints), the user's class, and a current timestamp.

In one embodiment, one or more of the following determinations is made to determine whether to provide the particular user with access to the particular content based on the selected offer and the selected set of constraints ("view limit"):

1) Whether selected view limit is active—A determination is made regarding whether the selected view limit is currently active. If the selected view limit is not currently active, then a determination is made not to provide the particular user with access to the particular content based on the selected offer and the selected view limit. In one embodiment, a view limit is not currently active if a) the current timestamp does not fall within the time period specified in the use-time rule (referred to as the "use time constraint") or b) no use time constrain exists and a sales time constraint exists and the current timestamp does not fall within the sales time constraint. (If the current timestamp does fall within the sales time constraint, then the offer is available for sale, and the user can be given the opportunity to accept the offer (see step 7 of FIG. 4A and step 1 of FIG. 4B).) In this embodiment, if no use time constraint exists, then the sales time constraint is treated as a use time constraint (i.e., alternative (b)). In another embodiment, if no use time constraint exists, then "forever" is treated as a use time constraint (i.e., the view limit can be used anytime).

2) Whether view count constraint of selected view limit is equal to zero—A determination is made regarding whether the view count constraint of the selected view limit is equal to zero (thereby specifying unlimited access). If the view count constraint is equal to zero, then a determination is made to provide the particular user with access to the particular content based on the selected offer and the selected view limit.

3) Whether the access token data's grant timestamp is earlier than the current timestamp minus the reset period—A determination is made regarding whether a) the user is logged in and the user class associated with the selected view limit is Paid or Registered or b) the user is not logged in and the user class associated with the selected view limit is Any. If either (a) or (b) is true, then access token data is obtained so that the view limit constraints can be checked. Specifically, access token data is obtained from the access token data repository 340 for the offer ID (e.g., a pair of <website name, offer name>, where "website" is the website associated with the URL, and "offer name" is the name of the selected offer) and the user ID. In particular, access token data is obtained where the user class specified in the access token data matches the user class associated with the selected view limit. Recall that access token data is specific to a particular user and a particular offer and includes, in one embodiment, a user class, a tokens granted number, a tokens used number, and (optionally) a granted timestamp.

If a) the access token data is not found or b) the access token information's grant timestamp is earlier than the current timestamp minus the reset period, then i) the access token data's tokens granted number is set to the view count constraint of the view limit, ii) the access token data's tokens used number is set to zero, and iii) the access token data's grant timestamp is set to the current timestamp. If the access token data is not found (i.e., situation (a)), this means that the selected view limit has never been used by this user. If the access token information's grant timestamp is earlier than the current timestamp minus the reset period (i.e., situation (b)), this means that the offer should be "renewed" (as if the user were just accepting the offer now). In both situations, the user should be able to access the content as many times as indicated in the view limit's view count constraint. This is accomplished by i) setting the tokens granted number to the view count constraint, ii) setting the tokens used number to zero, and iii) setting the grant timestamp to the current timestamp.

If the access token data's tokens used number is less than the access token data's tokens granted number, then the access token data's tokens used number is incremented by one, and a determination is made to provide the particular user with access to the particular content based on the selected offer and the selected view limit. If the access token data's tokens used number is less than the access token data's tokens granted number, this means that the user has not reached the view count limit and should be able to access the content. In this situation, the user is provided access to the content, and the tokens used number is incremented by one.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of determining whether a user is allowed to access a content item, the method comprising:
   executing, using a processor:
      receiving a query regarding whether the user is allowed to access the content item;
      determining, based on the query, a website associated with the content item;
      determining a set of offers associated with the website;
      determining, from the set of offers, a subset of offers that apply to the content item;
      identifying, from the subset of offers, an offer that includes a set of use-time rules specifying time periods during which the offer can be used to access content and includes a set of view count rules specifying how many times a user may view the content item, wherein the use-time rules and the view count rules are associated with user classes;
      determining a class of the user with respect to the offer, wherein the user's class indicates whether the user has accepted the offer or whether the user has registered with the website;
      determining whether the user is allowed to access the content item based on the offer, the user's class, and a current timestamp, comprising determining how many times the user has viewed the content item; and
      sending a query response that indicates whether the user is allowed to access the content item.

2. The computer-implemented method of claim 1, wherein determining whether the user is allowed to access the content item based on the offer, the user's class, and the current timestamp comprises identifying a use-time rule included in the offer that is associated with a user class that matches the user's class.

3. The computer-implemented method of claim 1, wherein determining whether the user is allowed to access the content item based on the offer, the user's class, and the current timestamp comprises determining whether the current timestamp falls within a time period specified by a use-time rule included in the offer.

4. The computer-implemented method of claim 1, wherein determining whether the user is allowed to access the content item based on the offer, the user's class, and the current timestamp comprises determining whether the user has accepted the offer.

5. The computer-implemented method of claim 4,
   wherein determining whether the user has accepted the offer comprises querying a payment processing system regarding whether the user purchased the offer, and
   further comprising responsive to the user having purchased the offer, determining that the user is allowed to access the content item.

6. The computer-implemented method of claim 1, wherein the offer further includes a regular expression that specifies whether the offer applies to the content item.

7. The computer-implemented method of claim 6,
   wherein the content item is associated with a uniform resource locator ("URL"), and
   wherein the offer applies to the content item if the regular expression matches the URL.

8. The computer-implemented method of claim 1,
   wherein the offer further includes a set of sales-time rules specifying time periods during which the offer can be sold, and
   wherein a sales-time rule is associated with a user class, and
   further comprising determining whether the user is allowed to accept the offer granting access to the content item based on the set of sales-time rules, the user's class, and a current timestamp.

9. The computer-implemented method of claim 1,
   wherein the offer further includes a geographic location that specifies from where the offer can be accepted, and
   further comprising determining whether the user is allowed to accept the offer granting access to the content item based on the geographic location and a location of the user.

10. A non-transitory computer-readable storage medium storing executable computer program instructions for determining whether a user is allowed to access a content item, the instructions performing steps comprising:
   receiving a query regarding whether the user is allowed to access the content item;
   determining, based on the query, a website associated with the content item;
   determining a set of offers associated with the website;
   determining, from the set of offers, a subset of offers that apply to the content item;
   identifying, from the subset of offers, an offer that includes a set of use-time rules specifying time periods during which the offer can be used to access content and includes a set of view count rules specifying how many times a user may view the content item, wherein the use-time rules and the view count rules are associated with user classes;

determining a class of the user with respect to the offer, wherein the user's class indicates whether the user has accepted the offer or whether the user has registered with the website;

determining whether the user is allowed to access the content item based on the offer, the user's class, and a current timestamp, comprising determining how many times the user has viewed the content item; and sending a query response that indicates whether the user is allowed to access the content item.

11. The non-transitory computer-readable storage medium of claim 10, wherein determining whether the user is allowed to access the content item based on the offer, the user's class, and the current timestamp comprises identifying a use-time rule included in the offer that is associated with a user class that matches the user's class.

12. The non-transitory computer-readable storage medium of claim 10, wherein determining whether the user is allowed to access the content item based on the offer, the user's class, and the current timestamp comprises determining whether the current timestamp falls within a time period specified by a use-time rule included in the offer.

13. The non-transitory computer-readable storage medium of claim 10, wherein determining whether the user is allowed to access the content item based on the offer, the user's class, and the current timestamp comprises determining whether the user has accepted the offer.

14. The non-transitory computer-readable storage medium of claim 10, wherein the offer further includes a regular expression that specifies whether the offer applies to the content item.

15. The non-transitory computer-readable storage medium of claim 14,
wherein the content item is associated with a uniform resource locator ("URL"), and
wherein the offer applies to the content item if the regular expression matches the URL.

16. The non-transitory computer-readable storage medium of claim 10,
wherein the offer further includes a set of sales-time rules specifying time periods during which the offer can be sold, and
wherein a sales-time rule is associated with a user class, and
wherein the steps further comprise:
determining whether the user is allowed to accept the offer granting access to the content item based on the set of sales-time rules, the user's class, and a current timestamp.

17. The non-transitory computer-readable storage medium of claim 10,
wherein the offer further includes a geographic location that specifies from where the offer can be accepted, and
wherein the steps further comprise:
determining whether the user is allowed to accept the offer granting access to the content item based on the geographic location and a location of the user.

18. An authorization system for determining whether a user is allowed to access a content item, the authorization system comprising:
at least one non-transitory computer-readable storage medium storing executable computer program instructions comprising instructions for:
receiving a query regarding whether the user is allowed to access the content item;
determining, based on the query, a website associated with the content item;
determining a set of offers associated with the website;
determining, from the set of offers, a subset of offers that apply to the content item;
identifying, from the subset of offers, an offer that includes a set of use-time rules specifying time periods during which the offer can be used to access content and includes a set of view count rules specifying how many times a user may view the content item, wherein the use-time rules and the view count rules are associated with user classes;
determining a class of the user with respect to the offer, wherein the user's class indicates whether the user has accepted the offer or whether the user has registered with the website;
determining whether the user is allowed to access the content item based on the offer, the user's class, and a current timestamp, comprising determining how many times the user has viewed the content item;
sending a query response that indicates whether the user is allowed to access the content item; and
a processor for executing the computer program instructions.

* * * * *